US010430388B1

(12) United States Patent
Saviano et al.

(10) Patent No.: US 10,430,388 B1
(45) Date of Patent: *Oct. 1, 2019

(54) SYSTEMS AND METHODS FOR INCREMENTAL LOADING OF COLLABORATIVELY GENERATED PRESENTATIONS

(71) Applicant: Google LLC, Mountain View, CA (US)

(72) Inventors: Steven Joseph Saviano, Brooklyn, NY (US); Igor Kopylov, Brooklyn, NY (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/134,715

(22) Filed: Sep. 18, 2018

Related U.S. Application Data

(63) Continuation of application No. 15/951,004, filed on Apr. 11, 2018, now abandoned, which is a continuation of application No. 15/248,986, filed on Aug. 26, 2016, now Pat. No. 9,946,725, which is a continuation of application No. 14/296,246, filed on
(Continued)

(51) Int. Cl.
| | |
|---|---|
| G06F 16/176 | (2019.01) |
| H04L 29/06 | (2006.01) |
| H04L 29/08 | (2006.01) |
| G06F 17/24 | (2006.01) |
| G06F 16/178 | (2019.01) |

(52) U.S. Cl.
CPC ........ *G06F 16/176* (2019.01); *G06F 16/1794* (2019.01); *G06F 17/24* (2013.01); *H04L 67/06* (2013.01); *H04L 67/1095* (2013.01); *H04L 67/42* (2013.01)

(58) Field of Classification Search
CPC .................................................. H04L 63/0414
See application file for complete search history.

(56) References Cited

U.S. PATENT DOCUMENTS

| | | |
|---|---|---|
| 5,231,577 A | 7/1993 | Koss |
| 5,408,470 A | 4/1995 | Rothrock et al. |
| (Continued) | | |

OTHER PUBLICATIONS

Simultaneously edit a presentation with other authors, by MicrosoftTM Office: MAC, published Nov. 11, 2010, pp. 1-4.
(Continued)

*Primary Examiner* — El Hadji M Sall
(74) *Attorney, Agent, or Firm* — Lowenstein Sandler LLP

(57) ABSTRACT

A method of collaborative document editing is disclosed. The method includes allowing concurrent document editing by a first user of a first client device and a second user of a second client device, receiving a first edit for a document stored at a server from the first client device, receiving a second edit for the document from the second client device, and merging the first edit and the second edit into the document. The method further includes receiving a request of a third user to access the document, determining whether the third user is authorized to access the document using a token associated with the third user, and in response to determining that the third user is authorized to access the document, providing at least a portion of the document with merged first and second edits for presentation to the third user.

20 Claims, 7 Drawing Sheets

Related U.S. Application Data

Jun. 4, 2014, now Pat. No. 9,621,541, which is a continuation of application No. 13/608,584, filed on Sep. 10, 2012, now Pat. No. 8,769,045, which is a continuation of application No. 13/275,044, filed on Oct. 17, 2011, now Pat. No. 8,266,245.

(56) References Cited

U.S. PATENT DOCUMENTS

| | | | |
|---|---|---|---|
| 5,557,722 A | 9/1996 | DeRose et al. | |
| 5,708,826 A | 1/1998 | Ikeda et al. | |
| 5,758,358 A | 5/1998 | Ebbo | |
| 5,761,669 A | 6/1998 | Montague et al. | |
| 5,793,966 A | 8/1998 | Amstein et al. | |
| 5,799,325 A | 8/1998 | Rivette et al. | |
| 5,819,304 A | 10/1998 | Nilsen et al. | |
| 6,049,664 A | 4/2000 | Dale et al. | |
| 6,061,697 A | 5/2000 | Nakao | |
| 6,073,144 A | 6/2000 | van Hoff | |
| 6,243,706 B1 | 6/2001 | Moreau et al. | |
| 6,314,425 B1* | 11/2001 | Serbinis | G06F 17/3089 |
| 6,327,584 B1 | 12/2001 | Xian et al. | |
| 6,341,305 B2 | 1/2002 | Wolfe | |
| 6,349,308 B1 | 2/2002 | Whang et al. | |
| 6,349,314 B1 | 2/2002 | Patel | |
| 6,377,957 B1 | 4/2002 | Jeyaraman | |
| 6,418,441 B1 | 7/2002 | Call | |
| 6,501,779 B1 | 12/2002 | McLaughlin et al. | |
| 6,662,210 B1 | 12/2003 | Carleton et al. | |
| 6,766,333 B1 | 7/2004 | Wu et al. | |
| 6,988,241 B1 | 1/2006 | Guttman et al. | |
| 7,017,112 B2 | 3/2006 | Collie et al. | |
| 7,031,954 B1 | 4/2006 | Kirsch | |
| 7,035,910 B1 | 4/2006 | Dutta et al. | |
| 7,069,502 B2 | 6/2006 | Numata et al. | |
| 7,162,693 B2 | 1/2007 | Yamanaka et al. | |
| 7,213,199 B2 | 5/2007 | Humenansky et al. | |
| 7,263,497 B1 | 8/2007 | Wiser et al. | |
| 7,305,613 B2 | 12/2007 | Oezgen | |
| 7,350,142 B2 | 3/2008 | Kraft et al. | |
| 7,437,421 B2 | 10/2008 | Bhogal et al. | |
| 7,478,330 B1 | 1/2009 | Branson et al. | |
| 7,491,399 B2 | 2/2009 | Vakharia | |
| 7,506,242 B2 | 3/2009 | Kotler et al. | |
| 7,529,778 B1 | 5/2009 | Dewey et al. | |
| 7,600,263 B1* | 10/2009 | Nguyen | G06F 21/6227 713/168 |
| 7,634,728 B2 | 12/2009 | Kraft | |
| 7,656,543 B2 | 2/2010 | Atkins | |
| 7,667,862 B2 | 2/2010 | Ziegler et al. | |
| 7,680,932 B2 | 3/2010 | Defaix et al. | |
| 7,698,379 B2 | 4/2010 | Dutta et al. | |
| 7,774,703 B2 | 8/2010 | Junuzovic et al. | |
| 7,890,928 B2 | 2/2011 | Patrudu | |
| 8,019,780 B1 | 9/2011 | Pinkerton et al. | |
| 8,151,204 B2 | 4/2012 | Lusen et al. | |
| 8,184,811 B1 | 5/2012 | Patten et al. | |
| 8,196,029 B1* | 6/2012 | Rucker | G06F 17/2288 715/200 |
| 8,266,534 B2 | 9/2012 | Curtis et al. | |
| 8,332,815 B2 | 12/2012 | Balfe et al. | |
| 8,613,108 B1* | 12/2013 | Aggarwal | H04L 63/101 455/411 |
| 9,256,753 B2 | 2/2016 | Sawicki et al. | |
| 2001/0037346 A1 | 11/2001 | Johnson | |
| 2002/0032701 A1 | 3/2002 | Gao et al. | |
| 2002/0035580 A1 | 3/2002 | Tanabe | |
| 2002/0051185 A1 | 5/2002 | Yamaguchi et al. | |
| 2002/0133492 A1 | 9/2002 | Goldstein et al. | |
| 2002/0174085 A1 | 11/2002 | Nelson et al. | |
| 2002/0194302 A1 | 12/2002 | Blumberg | |
| 2003/0014406 A1 | 1/2003 | Faieta et al. | |
| 2003/0033287 A1 | 2/2003 | Shanahan et al. | |
| 2003/0037076 A1 | 2/2003 | Bravery et al. | |
| 2003/0037303 A1 | 2/2003 | Bodlaender et al. | |
| 2003/0084078 A1 | 5/2003 | Torii et al. | |
| 2003/0105719 A1 | 6/2003 | Berger et al. | |
| 2003/0145279 A1 | 7/2003 | Bourbakis et al. | |
| 2004/0044965 A1 | 3/2004 | Toyama et al. | |
| 2004/0085354 A1 | 5/2004 | Massand | |
| 2004/0088653 A1 | 5/2004 | Bell et al. | |
| 2004/0133444 A1 | 7/2004 | Defaix et al. | |
| 2004/0215672 A1 | 10/2004 | Pfitzner | |
| 2004/0215825 A1 | 10/2004 | Pfitzner | |
| 2004/0215826 A1 | 10/2004 | Pfitzner | |
| 2004/0216090 A1 | 10/2004 | Kaler et al. | |
| 2004/0248612 A1 | 12/2004 | Lee et al. | |
| 2004/0255005 A1 | 12/2004 | Spooner | |
| 2005/0055337 A1 | 3/2005 | Bebo et al. | |
| 2005/0091291 A1 | 4/2005 | Kaler et al. | |
| 2005/0125461 A1 | 6/2005 | Filz | |
| 2005/0131887 A1 | 6/2005 | Rohrabaugh et al. | |
| 2005/0144256 A1 | 6/2005 | Blumberg | |
| 2005/0185636 A1 | 8/2005 | Bucher | |
| 2005/0200896 A1 | 9/2005 | Narusawa et al. | |
| 2005/0246526 A1 | 11/2005 | Forlenza et al. | |
| 2005/0273695 A1 | 12/2005 | Schnurr | |
| 2006/0031751 A1 | 2/2006 | Ehud | |
| 2006/0075332 A1 | 4/2006 | Fairweather et al. | |
| 2006/0101071 A1 | 5/2006 | Henderson | |
| 2006/0149831 A1 | 7/2006 | Dutta et al. | |
| 2006/0200755 A1 | 9/2006 | Melmon et al. | |
| 2006/0230344 A1 | 10/2006 | Jennings et al. | |
| 2007/0033654 A1 | 2/2007 | Wilson | |
| 2007/0061714 A1 | 3/2007 | Stuple et al. | |
| 2007/0070066 A1 | 3/2007 | Bakhash | |
| 2007/0186157 A1 | 8/2007 | Walker et al. | |
| 2007/0208992 A1 | 9/2007 | Koren | |
| 2007/0220068 A1 | 9/2007 | Thompson et al. | |
| 2007/0288637 A1 | 12/2007 | Layton et al. | |
| 2008/0028302 A1 | 1/2008 | Meschkat | |
| 2008/0034008 A1 | 2/2008 | Burke et al. | |
| 2008/0040659 A1 | 2/2008 | Doyle | |
| 2008/0059417 A1 | 3/2008 | Yamada et al. | |
| 2008/0059539 A1 | 3/2008 | Chin et al. | |
| 2008/0082604 A1 | 4/2008 | Mansour et al. | |
| 2008/0126943 A1 | 5/2008 | Parasnis et al. | |
| 2008/0127212 A1 | 5/2008 | Nakamizo et al. | |
| 2008/0222273 A1 | 9/2008 | Lakshmanan et al. | |
| 2009/0055755 A1 | 2/2009 | Hicks et al. | |
| 2009/0089664 A1 | 4/2009 | Wagner et al. | |
| 2009/0112953 A1 | 4/2009 | Barsness et al. | |
| 2009/0112990 A1 | 4/2009 | Campbell et al. | |
| 2009/0119572 A1 | 5/2009 | Koivunen | |
| 2009/0132907 A1 | 5/2009 | Shao et al. | |
| 2009/0164620 A1 | 6/2009 | Ziegler et al. | |
| 2009/0307585 A1 | 12/2009 | Tranchant et al. | |
| 2009/0327294 A1* | 12/2009 | Bailor | G06F 17/24 |
| 2010/0005410 A1 | 1/2010 | Pang | |
| 2010/0017615 A1 | 1/2010 | Boesgaard | |
| 2010/0030578 A1 | 2/2010 | Siddique et al. | |
| 2010/0050089 A1 | 2/2010 | Kim et al. | |
| 2010/0070852 A1 | 3/2010 | Li | |
| 2010/0083096 A1 | 4/2010 | Dupuis-Latour et al. | |
| 2010/0205230 A1 | 8/2010 | Simeonov et al. | |
| 2010/0205520 A1 | 8/2010 | Parish et al. | |
| 2010/0218099 A1 | 8/2010 | van Melle et al. | |
| 2010/0229086 A1 | 9/2010 | Howell et al. | |
| 2010/0235763 A1 | 9/2010 | Massand | |
| 2010/0245256 A1 | 9/2010 | Estrada et al. | |
| 2010/0251122 A1 | 9/2010 | Lee et al. | |
| 2010/0281076 A1 | 11/2010 | Pan et al. | |
| 2010/0309436 A1 | 12/2010 | Allen, Jr. et al. | |
| 2010/0318894 A1 | 12/2010 | Billharz et al. | |
| 2011/0035661 A1 | 2/2011 | Balinsky et al. | |
| 2011/0051158 A1 | 3/2011 | Yamahata et al. | |
| 2011/0066957 A1 | 3/2011 | Prats et al. | |
| 2011/0078246 A1 | 3/2011 | Dittmer-Roche | |
| 2011/0085211 A1 | 4/2011 | King et al. | |
| 2011/0099093 A1 | 4/2011 | Mills | |
| 2011/0164043 A1 | 7/2011 | Arora et al. | |
| 2011/0179427 A1 | 7/2011 | Krishnamoorthy et al. | |
| 2011/0219331 A1 | 9/2011 | DeLuca et al. | |
| 2011/0252299 A1 | 10/2011 | Lloyd et al. | |

(56) References Cited

U.S. PATENT DOCUMENTS

| | | | |
|---|---|---|---|
| 2011/0252335 A1 | 10/2011 | Lloyd et al. | |
| 2011/0252339 A1 | 10/2011 | Lemonik et al. | |
| 2011/0264712 A1 | 10/2011 | Ylonen | |
| 2011/0282933 A1 | 11/2011 | Schmier | |
| 2011/0296299 A1 | 12/2011 | Parker | |
| 2012/0072821 A1 | 3/2012 | Bowling | |
| 2012/0117406 A1 | 5/2012 | Eun | |
| 2012/0117452 A1 | 5/2012 | Lloyd et al. | |
| 2012/0131483 A1 | 5/2012 | Archer et al. | |
| 2013/0080507 A1 | 3/2013 | Ruhlen et al. | |
| 2013/0080785 A1 | 3/2013 | Ruhlen et al. | |
| 2014/0032489 A1* | 1/2014 | Hebbar | G06F 17/30896 707/608 |
| 2014/0033013 A1* | 1/2014 | Shaver | G06F 17/24 715/230 |

OTHER PUBLICATIONS

Advisory Action dated Sep. 7, 2012 for U.S. Appl. No. 13/274,723.
Bibi et al., A Platform for Delivering Multimedia Presentations on Cultural Heritage, 2010 14th Panhellenic Conference on Informatics, pp. 175-179.
Ellis et al., "Concurrency Control in Groupware Systems," ACM 1989, pp. 399-407.
Final Office Action dated May 31, 2012 for U.S. Appl. No. 13/274,720.
Final Office Action dated Jun. 1, 2012 for U.S. Appl. No. 13/274,797.
Final Office Action dated Jun. 14, 2012 for U.S. Appl. No. 13/275,093.
Final Office Action dated Jun. 20, 2012 for U.S. Appl. No. 13/274,723.
Final Office Action dated Nov. 16, 2012 for U.S. Appl. No. 13/274,716.
Final Office Action dated Dec. 7, 2012 for U.S. Appl. No. 13/275,123.
Huang et al., "A General Purpose Virtual Collaboration Room," Google 1999, pp. 1-9.
Kindberg, Mushroom: A Framework for Collaboration and Interaction across the Internet, Google 1996, pp. 1-11.
Krieger, "Documents, Presentations, and Workbooks: Using Microsoft® Office to Create Content That Gets Noticed," published May 2011, pp. 1-104.
Mulvany, "What's Going on in Indexing," ACM 1997, pp. 10-15.
Munteaunu et al., "Collaborative Editing for Improved Usefulness and Usability of Transcript-Enhanced Webcasts," ACM 2008, pp. 373-382.
Non Final Office Action dated Aug. 31, 2012 for U.S. Appl. No. 13/275,101.
Non-Final Office Action dated Jan. 6, 2012 for U.S. Appl. No. 13/275,093.
Non-Final Office Action dated Jan. 11, 2012 for U.S. Appl. No. 13/274,797.
Non-Final Office Action dated Jan. 19, 2012 for U.S. Appl. No. 13/274,716.
Non-Final Office Action dated Feb. 17, 2012 for U.S. Appl. No. 13/275,123.
Non-Final Office Action dated Feb. 29, 2012 for U.S. Appl. No. 13/274,723.
Non-Final Office Action dated Mar. 1, 2012 for U.S. Appl. No. 13/275,101.
Non-Final Office Action dated Jun. 12, 2012 for U.S. Appl. No. 13/274,716.
Non-Final Office Action dated Jul. 20, 2012 for U.S. Appl. No. 13/084,951.
Non-Final Office Action dated Dec. 30, 2011 for U.S. Appl. No. 13/274,720.
Notice of Allowance dated May 14, 2012 for U.S. Appl. No. 13/275,044.
Pacull et al., Duplex: A Distributed Collaborative Editing Environment in Large Scale, ACM 1994, pp. 165-173.
Raggett, Dave, "Slidy—a web based alternative to Microsoft PowerPoint," published 2006, pp. 1-13.
Taylor, "Cool Apple Keynote Presentation Tricks and Tips," published Apr. 2011, p. 1-5.

* cited by examiner

SYSTEMS AND METHODS FOR INCREMENTAL LOADING OF COLLABORATIVELY GENERATED PRESENTATIONS

CROSS REFERENCE TO RELATED APPLICATIONS

This application is a continuation of co-pending U.S. patent application Ser. No. 15/951,004 filed Apr. 11, 2018, which is a continuation of U.S. patent application Ser. No. 15/248,986, filed Aug. 26, 2016, now U.S. Pat. No. 9,946,725, which is a continuation of U.S. patent application Ser. No. 14/296,246, filed Jun. 4, 2014, now U.S. Pat. No. 9,621,541, which is a continuation of U.S. patent application Ser. No. 13/608,584, filed Sep. 10, 2012, now U.S. Pat. No. 8,769,045, which is a continuation of U.S. patent application Ser. No. 13/275,044 filed Oct. 17, 2011, now U.S. Pat. No. 8,266,245, each of which is incorporated herein by reference in its entirety.

BACKGROUND OF THE INVENTION

This disclosure generally relates to presentation applications, and more specifically, to the concurrent use of network-based collaborative presentation applications by multiple collaborators.

Conventional electronic presentation applications may be used to create electronic documents for pages or slides that are used in a presentation. These presentation slides often include text, images, graphics, audio, video, multimedia, objects and other data to provide a rich audio/visual display to accompany an oral presentation. Some presentation applications are used in a local environment, for example on a single user's computer. Other presentation applications may be shared on a network with multiple users. Shared presentation documents can be difficult to maintain and update accurately, particularly when the shared presentation documents are used and edited concurrently by multiple users.

In some instances the presentations and/or the presentation application may be stored partially or entirely remote from the client. In such instances, particularly with respect to presentations that are rich in media, attempting to download entire presentations prior to presenting any of the slides may incur substantial delays. In collaborative environments, partial downloading of presentations to limit delays incurs the risk of conflicts arising from third party document edits between the downloading of various portions of the presentation.

SUMMARY OF THE INVENTION

Thus, a need exists in the art for managing the incremental retrieval by clients of portions of presentations in a collaborative setting. Accordingly, a collaborative presentation application is disclosed herein that provides to a user a consistent view of a presentation while leveraging incremental downloading to expedite presentation access.

According to one aspect, the invention relates to a system for incrementally communicating a document to a client computer. The system includes a processor and a memory. The memory stores computer executable instructions, which when executed by the processor cause the processor to receive a first request from a user at a client computer to view a first portion of the document, transmit to the user the first portion of a first version of the document over an electronic network in response to the first request, and receive a second request from the user to receive a second portion of the document. The second request indicates a document version from which the user seeks the second portion of the document. The computer executable instructions, when executed, further cause the processor to determine whether the user is authorized to receive the second portion from the document version indicated by the second request. In response to determining that the user is authorized to receive the second portion of the document from the document version indicated by the second request, the computer executable instructions cause the processor to transmit the second portion of the document version indicated by the second request to the client computer. In response to determining that the client computer is not authorized to receive the second portion of the document from the document version indicated by the second request, the computer readable instructions cause the processor to output an error message.

According to another aspect, the invention relates to a system for incrementally loading a document. The system includes a processor and a memory. The memory stores computer executable instructions, which when executed by the processor cause the processor to transmit to a server a first request requesting access for a user to a first portion of a document, receive the first portion of a first version of the document, and transmit a second request to the server requesting access to a second portion of a second version of the document for the user. In response to the second request requesting access to a version of the document to which the user has authorization to access, the computer readable instructions further cause the processor to receive from the server the second portion of the second version of the document. In response to the second request requesting access to a version of the document to which the user lacks authorization to access, the computer readable instructions further cause the processor to receive an error message from the server.

According to additional aspects, the invention relates to methods of incrementally communicating a document to a client computer and incrementally loading a document, as carried out by the systems described above.

BRIEF DESCRIPTION OF THE DRAWINGS

Further features of the invention, its nature and various advantages, will be apparent upon consideration of the following detailed description, taken in conjunction with the accompanying drawings, in which like reference characters refer to like parts throughout, and in which.

DESCRIPTION OF CERTAIN ILLUSTRATIVE EMBODIMENTS

To provide an overall understanding of the invention, certain illustrative embodiments will now be described, including systems and methods for providing time consistent access to collaboratively generated presentations. However, it will be understood by one of ordinary skill in the art that the systems and methods described herein may be adapted and modified as is appropriate for the application being addressed and that the systems and methods described herein may be employed in other suitable applications, and that such other additions and modifications will not depart from the scope thereof.

Overview

Aspects of the invention relate to a presentation application which may be used in an online networked environment for collaboration between multiple users. Some or all of the users may be physically remote from the others. Various viewers may be granted varying permission levels to access documents created via the system. Documents using the presentation application may be viewed in a time-consistent fashion, despite modifications made to the presentation by others.

System Description

Figure 1:
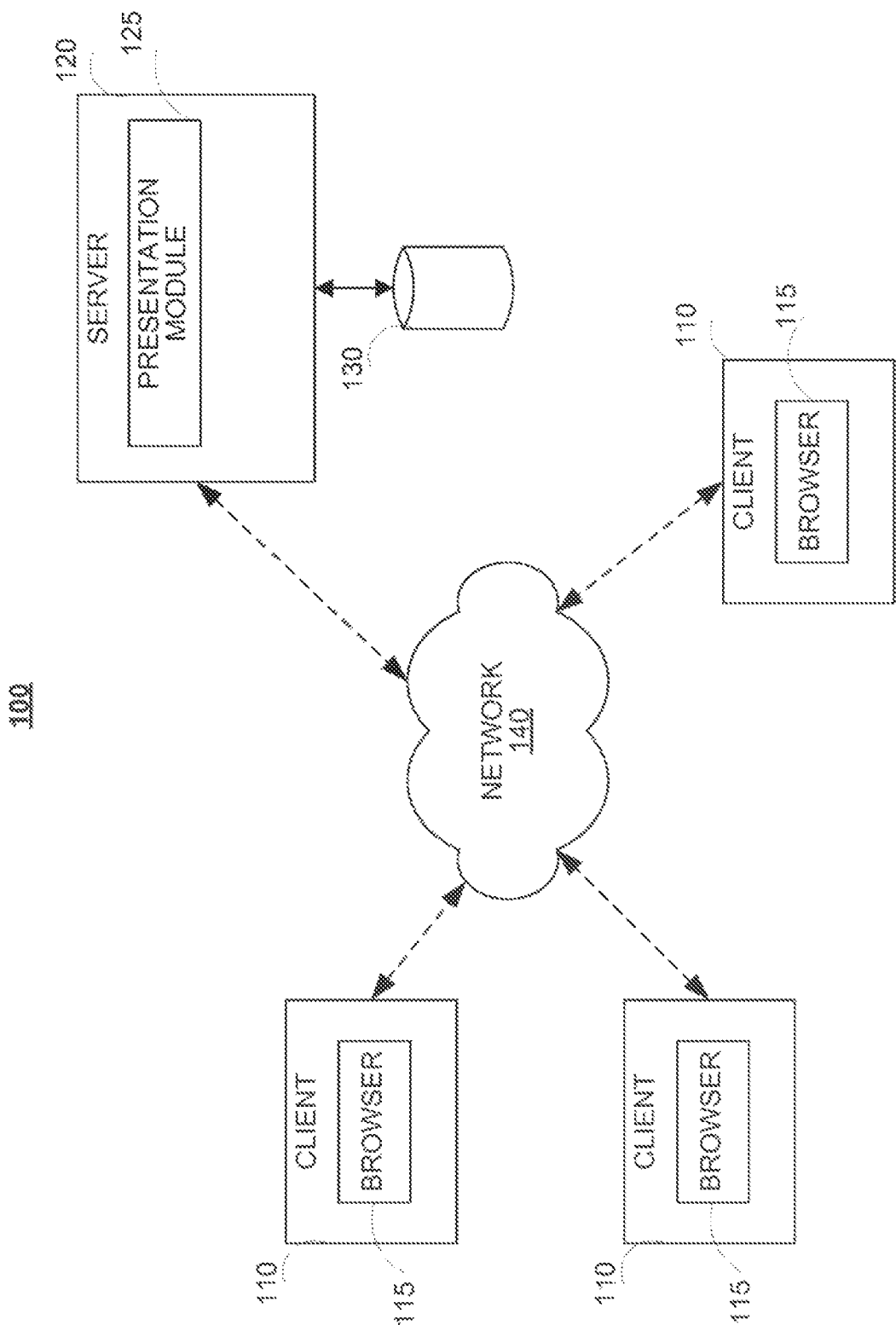
FIG. 1 is an exemplary diagram of a collaborative presentation system, according to an illustrative embodiment of the invention.

FIG. 1 is a diagram of an exemplary system 100 in which concepts consistent with the principles of the invention may be implemented. System 100 may include multiple clients 110 that can connect to servers, such as server 120, via network 140. Network 140 may be any network, such as an intranet, the Internet, a local area network (LAN), a wide area network (WAN), a telephone network, or a combination of networks. Although only one server 120 and three clients 110 are shown in FIG. 1, any number or combination of servers and clients may be used. In some aspects, a client and server may perform functions of the other.

A client 110 may include a device, such as a personal computer, a lap top computer, tablet, a smart phone, a personal digital assistant (PDA), or other type of computer or communication device. Users of clients 110 may access or receive information from server 120 over the network 140.

As shown in FIG. 1, clients 110 may generally interact with server 120 such that clients 110, in conjunction with server 120, execute an online presentation application. Server 120 may include software, such as presentation module 125, for implementing the online presentation application. Online presentation applications created by users of clients 110 may be stored by server 120 in, for example, storage media such as database 130. Although illustrated as a single device in FIG. 1, server 120 may be implemented as, for example, a single computing device or as multiple distributed computing devices. One of ordinary skill in the art will appreciate that whether a device is functioning as a server or a client often depends on the specific application being implemented and the client-server relationship.

The interaction of clients 110 with server 120 may be through a browser 115 at each client 110. For example, the online presentation application may be an application that runs and is displayed within a browser 115. In this arrangement, clients 110 may not need to install presentation software to use the online presentation at client 110. Browser programs are well known and are widely available in the art. When browsers or browser programs are discussed herein, these terms are intended to refer to any program that allows a user to browse markup documents (e.g., web documents), regardless of whether the browser program is a stand alone program or an embedded program, such as a browser program included as part of an operating system.

An online presentation application, as described herein, may be implemented as a distributed web application in which portions of the application may be executed at one or more of clients 110 and at server 120. More specifically, clients 110 that wish to use the online presentation application may request the presentation application from server 120. In response, server 120 may transmit portions of the presentation application for local execution at clients 110. The online presentation application may thus execute as a distributed application across server 120 and one or more of clients 110.

Presentation module 125 may include components, not shown, for example, a front-end component that interfaces with clients 110, and a back-end component for processing presentation features as well as supporting the collaborative document updating further described herein.

Online Presentation Collaboration

Figure 2:
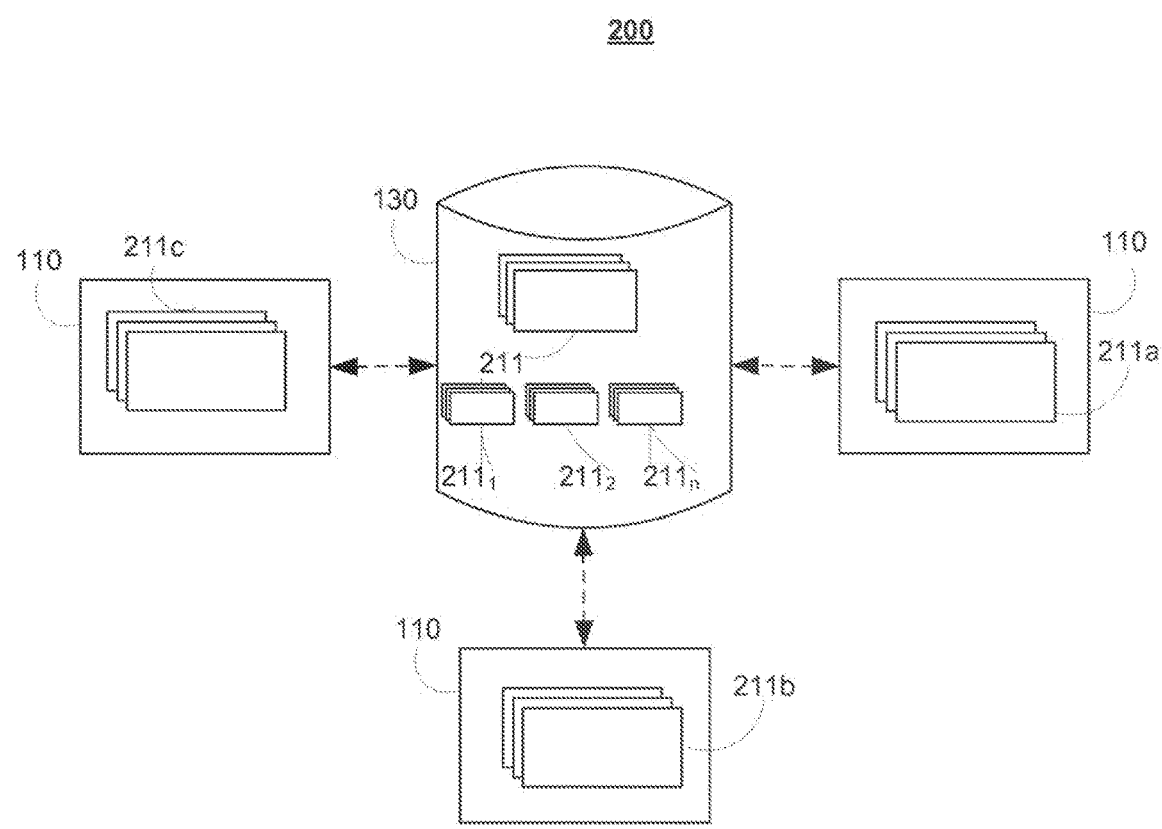
FIG. 2 is an alternative view of the collaborative presentation system of FIG. 1, according to an illustrative embodiment of the invention.

Presentation documents may be used collaboratively online using the system 100. For example, as shown in FIG. 2, a presentation master document 211 may be stored in server data storage 130 and accessed using clients 110. Individual user copies 211a-n of the presentation document may be viewed at the client 110. Generally speaking, the display of user copies 211a-n at client 110 are substantially identical and are updated in the client browser 115 based on the presentation master document 211, which includes merged changes to user copies 211a-n received from all users at clients 110.

However, in some circumstances, for example, when actually presenting a presentation, users having permission to edit presentations (referred to as editor-users) may wish to access a time-consistent version of the presentation, such that their view of the presentation is not affected by other users' edits. Similarly, other users (referred to as viewer-users) may be granted limited permissions to access the presentation. Viewer-users may only be granted access to a single time-consistent view of the presentation. To support this functionality, the server 120 stores multiple time consistent versions $211.\text{sub}.1$ to $211.\text{sub}.n$ of the presentation at the server. The time consistent versions $211.\text{sub}.1$ to $211.\text{sub}.n$ are stored in a read-only fashion so that a user can access them in a time consistent fashion. The respective time consistent versions $211.\text{sub}.1$ to $211.\text{sub}.n$ may be stored for a predetermined amount of time, until the presentation master document 211 differs from respective time consistent versions $211.\text{sub}.1$ to $211.\text{sub}.n$ to more than a predetermined degree, or until users accessing the respective time consistent versions $211.\text{sub}.1$ to $211.\text{sub}.n$ have released such versions.

The time consistent versions $211.\text{sub}.1$ to $211.\text{sub}.n$ need not be formally distinct versions of a document, e.g., in the context of a document management system. That is, as one of ordinary skill in the art would recognize, current document management systems typically store multiple versions of documents, often distinguished by version number. In the system 100, the server 120 may simultaneously store multiple time-consistent versions of a single version number of a document, each referred to herein as a meta-version. Thus, if a viewer-user opens a version, e.g., version 3 of a first document, and an editor-user subsequently opens, edits, and saves the same version 3 of the first document, the server 120 preserves a meta-version of the unedited version 3 such that the viewer-user can continue to access it in an unchanged form. The server 120 deletes the meta-version upon the viewer-user closing or otherwise releasing the version of the document. As user herein a version of a document shall refer to either a formal version of a document as well as to meta-versions of a document.

Incremental Presentation Loading Process

Figure 3:
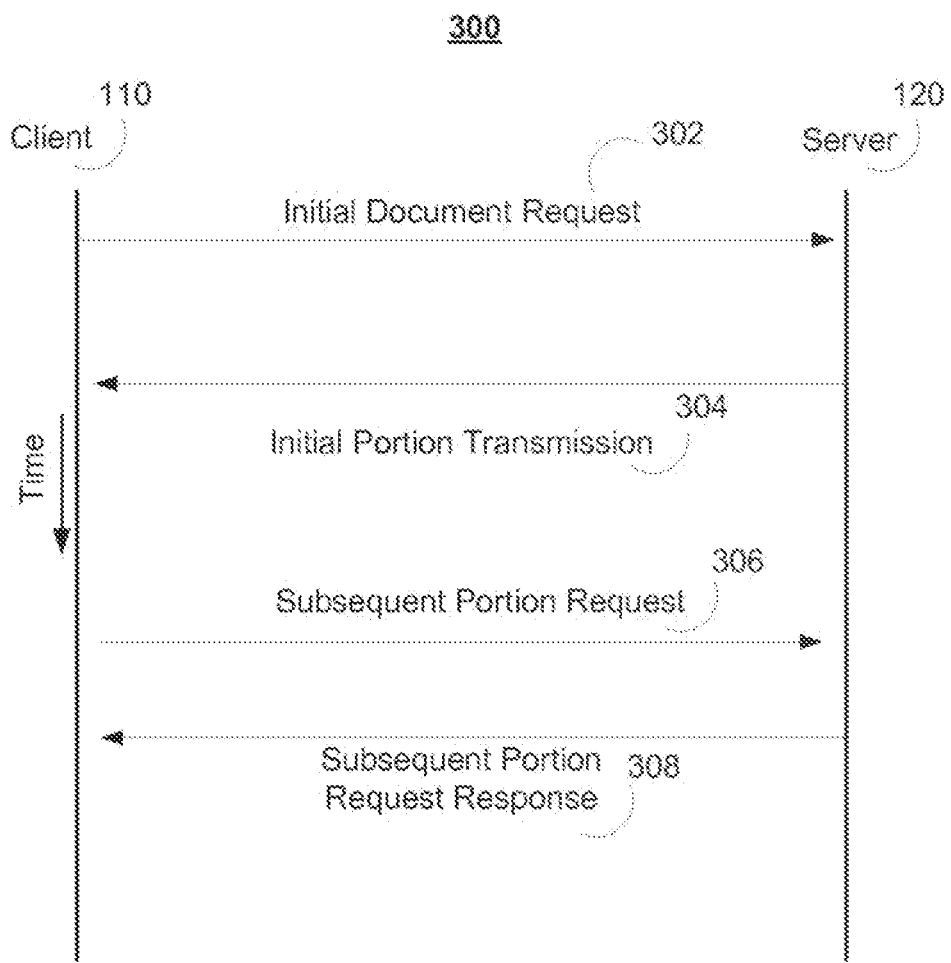
FIG. 3 is a timing diagram illustrating the timing of various communications between a client and a server to implement an incremental presentation loading process suitable for use by the system of FIGS. 1 and 2, according to an illustrative embodiment of the invention.

FIG. 3 is a timing diagram illustrating the timing of various communications between a client, such as client 110, and a server, such as server 120, to implement an incremental presentation loading process 300, according to an illustrative embodiment of the invention. The incremental presentation loading process 300 is configured primarily for use by users having limited permissions. For example, the incremental presentation loading process 300 is particularly suited for users who are granted permission to access only a single version of presentation, which is not updated to reflect edits that may have occurred between document portion downloads. In addition, the incremental loading process 300 is well suited for editor-users who elect to view a presentation in a time-consistent fashion.

The incremental presentation loading process 300 begins with a user operating on a client device, such as client 110, requesting access to a presentation via an initial document request 302. This initial document request 302 includes a user identifier as well as a document identifier. The initial document request 302 may include data identifying a specific time consistent version of the presentation, e.g., any one of time consistent versions 211.sub.1 to 211.sub.n, the user is requesting. Alternatively, the initial document request 302 may omit a version identifier. In response to requests that omit a requested version identifier, the server 120 interprets the request to be for the most recent version of the presentation, e.g., the presentation master document 211. The server 120 then stores a copy of master presentation document 211 as a new time-consistent version 211.sub.n+1, for subsequent access by the user. The initial document request may be accompanied by a digital certificate or other authenticating data object to authenticate the user to the server 120.

In response to the initial document request 302, the server 120 responds by transmitting an initial portion transmission 304 to the client 110. The initial portion transmission 304 includes an initial portion of the requested presentation 211 along with a permissions token and data indicating the number of portions included in the presentation. As used herein, a portion refers to any discrete segment of a presentation document, including, for example, one or more presentation slides or one or more media files. The permissions token includes data from which the server 120 can verify the version or versions of the requested presentation from which the user is permitted to download additional presentation portions.

In one implementation, the permissions token includes a hash of the user identification, the document identifier, and the version identifier received in the initial document request 302. The applied hash function is a secure one-way cryptographic hash function known solely to the server 120. In alternative implementations, the permissions token includes additional data, including, for example a time stamp indicating the time that the initial document request 302 was received or the time the initial portion transmission 304 was transmitted. Such information can be used by the server 120 to limit the time with which the user can access a version of the presentation to limit the possibility of the user receiving overly stale information. The hash may also be based on the time stamp.

Upon receiving the initial portion transmission 304, the user can request additional portions of the presentation through a subsequent portion request 306. The subsequent portion request includes the user's user identifier, the document identifier, a version identifier, and the permissions token received in the initial portion transmission 304.

In response to receiving the subsequent portion request 306, the server 120 verifies whether the user is permitted to download presentation portions from the document identifier-version identifier pair included in the subsequent portion request 306. In particular, the server calculates a hash of the user identifier, document identifier, and version identifier included in the subsequent portion request 306 using the same hash function used to create the hash included in the initial portion transmission 304. The server then compares the newly computed hash with the hash included in the subsequent portion request 306. Alternatively, the server 120 compares the newly computed hash with a locally saved copy of the hash included in the initial portion transmission 304. In either case, if the two hashes match, the server 120 transmits the requested subsequent portion to the user at the client 110 in a subsequent portion request response 308. In some implementations, the subsequent portion request response 308 may also include a flag indicating whether the presentation master document 211 has been modified with respect to the requested version. Upon this flag being set to true, the presentation application may alert a user, for example, through a separate control window.

In implementations in which the permissions token includes a time stamp, if the hashes match, confirming the authenticity of the time stamp, the server 120 compares the time stamp to a timing criteria to determine whether the user still has permission to access the document/version pairing. In one implementation, the timing criteria includes an absolute time limit for which the user is granted permission to download portions of the version of the presentation. If the time limit has been exceeded, the server issues an error in the subsequent portion request response 308.

In still other implementations, independent of or in conjunction with any time stamp that may be included in prior messages, the server 120 determines whether the user's permission to access the requested document version may have been revoked despite the matching hash. For example, permissions may be revoked if the presentation master document 211 has more than a threshold level of difference with the version requested by the user. Alternatively, permissions may be revoked if more than a threshold period of time has passed since revisions have been made to requested document in comparison to the requested version. The revocation criteria may be set by users with editor or administrative permissions on a document by document basis, a user by user basis, permission level by permission level basis, workgroup by workgroup basis, or any combination of the above. Upon permission being revoked with respect to a particular version of the document, the user is forced to restart the presentation download process with the then current state of the presentation master document 211.

The incremental presentation loading process 300 is described further below from the server and client perspectives in FIGS. 4-6.

Figure 4:
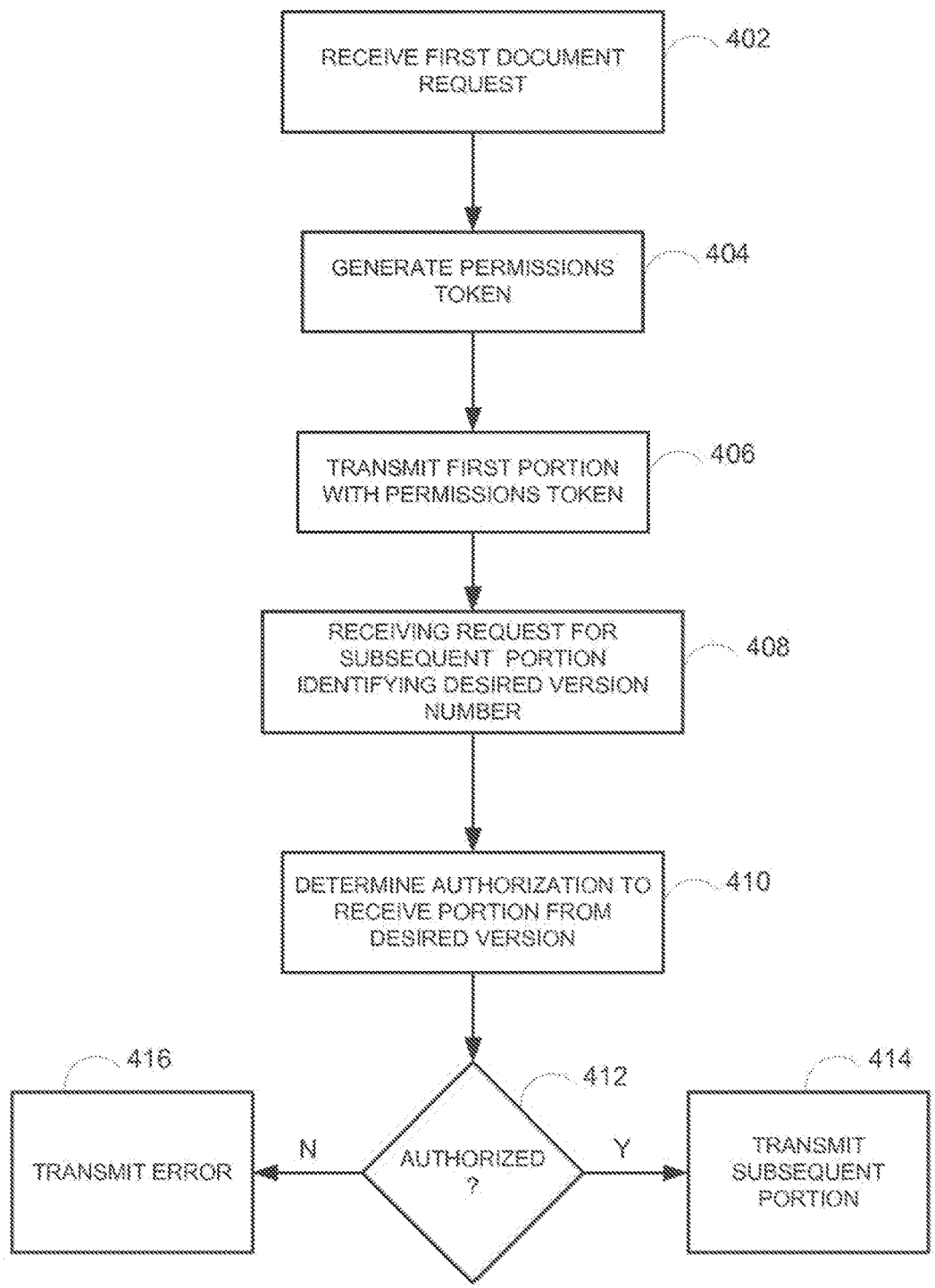
FIG. 4 is a flow chart of a method of handling presentation portion requests suitable for use by the system of FIGS. 1 and 2, according to an illustrative embodiment of the invention.

FIG. 4 is a flow chart of a method 400 of handling presentation portion requests according to an illustrative embodiment of the invention. The method 400 begins with a server, such as server 120, receiving an initial document request, such as initial document request 102 (step 402) from a user at a client device, such as client 110. As indicated above, the initial document request includes a user identifier, a document identifier, and in some cases, a version identifier. If no version identifier is included, the server assumes the request is for the presentation master document 211.

Based on the identifiers in the initial document request, the server 120 generates a permissions token that can be used to verify the permissions of the user with respect to which version or versions of the presentation the user may access (step 404). Preferably, the user is granted access to a single version of the presentation. The permissions token includes a one-way hash of the user identifier, the document identifier, and the version identifier. In alternative implementations the permissions token may include any data resulting from a cryptographic function or other substantially irreversible transformation of the set of identifiers.

The server transmits the initial portion, referred to as the head, of the requested version of the requested presentation to the user along with the permissions token (step 406). In an alternative embodiment, the server stores the permissions token locally (i.e., in physical memory located at the server itself, or preferably in memory accessible by multiple servers providing the presentation server).

Subsequently, the server receives a request for a second portion of the presentation, for example, as part of a subsequent portion request 306 (step 408). The request includes the user identifier, the document identifier, a requested portion number, the version identifier, and, if included in the initial portion transmission to the user, the permissions token. Based on this data, the server determines whether the user is authorized to receive the second portion of the presentation (step 410). This authorization determination (step 410) can be based on any of the authorization evaluations described above in relation to FIG. 3, including without limitation a comparison of a newly generated hash of data included in the request to the previously generated permissions token, evaluation of a time stamp, and/or an evaluation of a degree of difference between the requested version and the presentation master document 211.

If the server determines that that the user is authorized to receive the second portion from the requested version (decision block 412), the server transmits the second portion to the user at the client (step 414). If the server determines that that the user is not authorized to receive the second portion from the requested version (decision block 412), the server transmits an error message to the user (step 416). In one implementation, the error indicates the reason for the error message. For example, the error message may indicate whether the request was refused due to the identification of an incorrect version number, the expiration of a time limit, or due to degree of difference with respect to the presentation master document 211. The error message may be displayed to the user, for example, in a separate control window associated with the presentation application.

Figure 5:
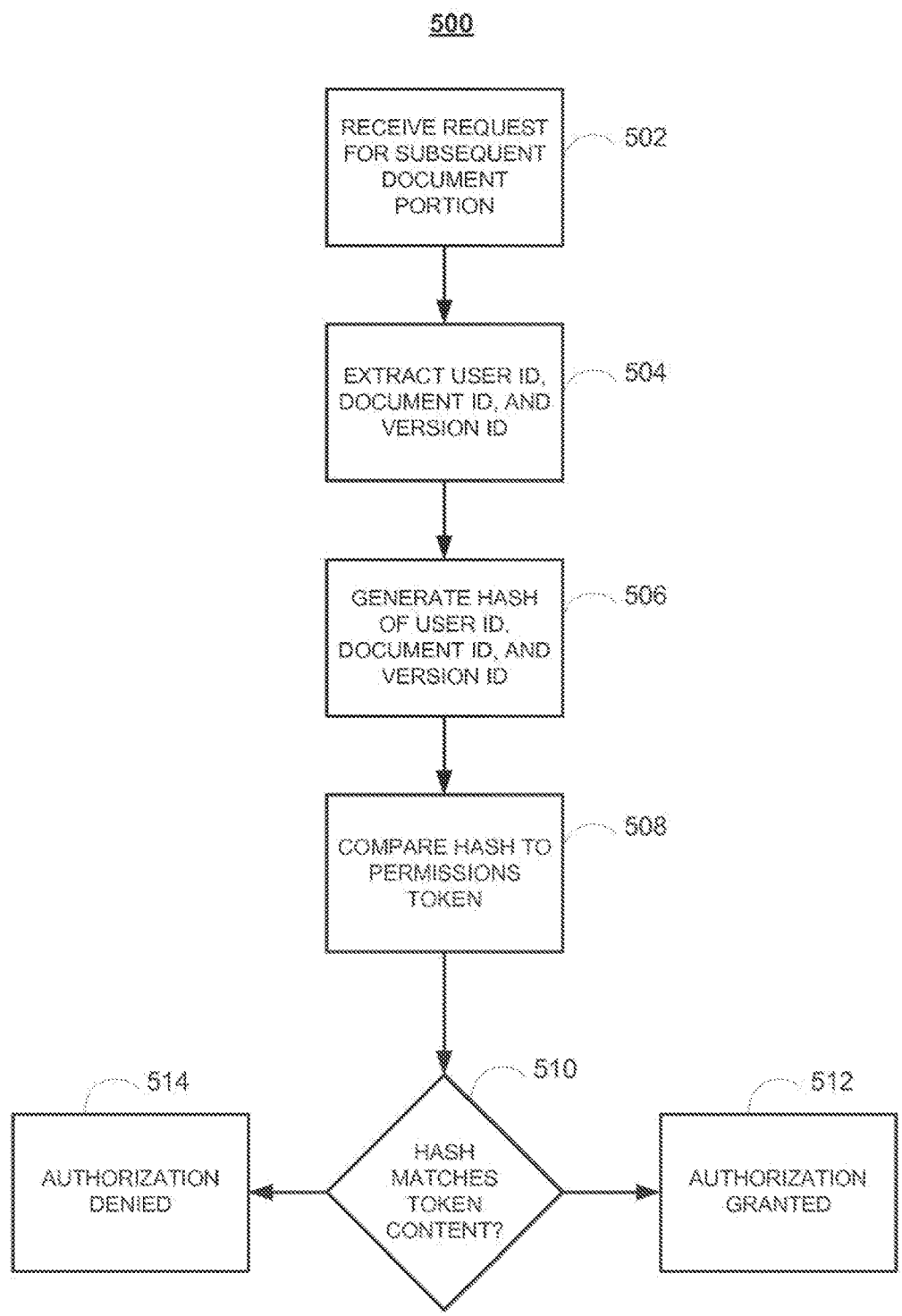
FIG. 5 is a more detailed flow chart of one particular method for verifying a user's permission to download a further portion of a presentation suitable for use by the system of FIGS. 1 and 2, according to an illustrative embodiment of the invention.

FIG. 5 is a more detailed flow chart of one particular method 500 for verifying a user's permission to download a further portion of a presentation, according to an illustrative embodiment of the invention. The method 500 begins with a server, such as server 120, receiving a subsequent document portion request from a user at a client, such as client 110 (step 502). The server extracts from the subsequent document portion request a user identifier, a document identifier, and a version identifier (step 504). The server then calculates a hash of the extracted triplet (step 506) and compares this newly generated hash to a previously generated hash (step 508). The previously generated hash in one implementation is extracted from a permissions token included in the subsequent document portion request. In another implementation, the previously generated hash is retrieved from server memory. If the hashes match (decision block 510), the server concludes the user is authorized to receive the requested subsequent portion (step 512). If not, the server denies the user authorization to the access the requested subsequent portion (step 514).

Figure 6:
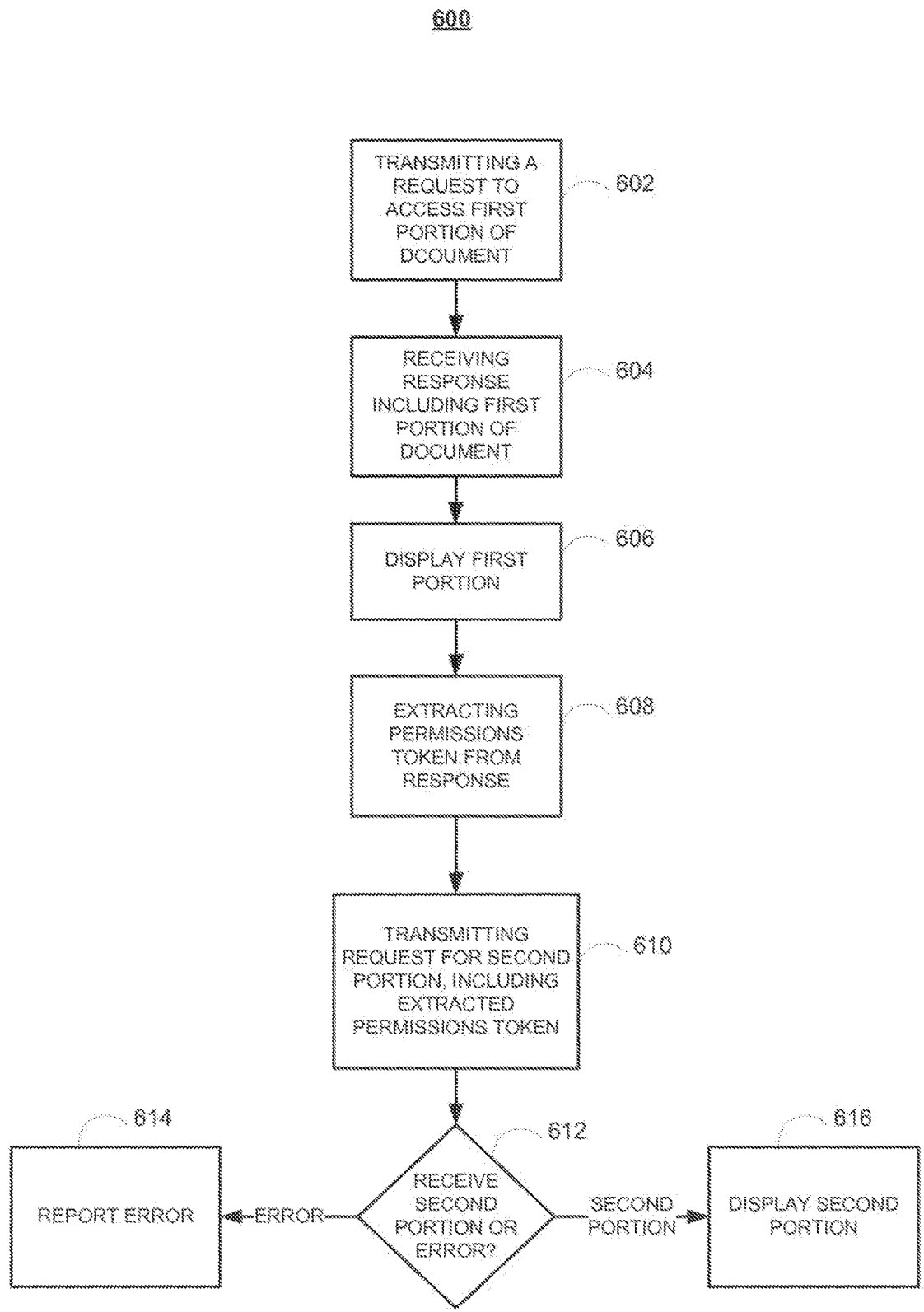
FIG. 6 is a flow chart of method for incremental loading of a presentation suitable for use by the system of FIGS. 1 and 2 from the perspective of a user, according to an illustrative embodiment of the invention.

FIG. 6 is a flow chart of method 600 for incremental loading of a presentation from the perspective of a user, such as the user of client 110 of FIG. 1, according to an illustrative embodiment of the invention. The incremental loading method 600 commences with the user at the client transmitting a request, such as the initial document request 302 of FIG. 3, to a server, such as server 120 (step 602). The user triggers the request, for example, through a user interface component (e.g., a file open icon or menu option) of the presentation application or a document management system or by selecting a URL embedded in another document, such as an e-mail, a word processing document, a spreadsheet, another presentation, or in a web page. For editor-users who wish to view a presentation in a time-consistent fashion, the initial document request may include a data flag indicating such desire. In response to the request, the client receives a first portion of the presentation from the server, for example, as part of an initial portion transmission 304 (step 604) along with a number of portions associated with the presentation. The user extracts a permissions token from the initial portion transmission (step 606) for inclusion in subsequent portion requests. The permission token may take the form of any of the permissions tokens described above. The user then displays the first portion of the presentation (step 608).

The user requests a subsequent portion of the presentation at step 610. The request may be for the second portion or any other portion of the presentation. The request may be initiated before or after the first portion is displayed. The subsequent portion request, as described above identifiers the requested portion, the user making the request, the document, and the version of the document. The portion may be identified by a slide number, portion number, URL, or any other suitable identifier for a portion of a presentation. In response to the subsequent portion request, the user receives either an error or the requested subsequent portion (decision block 612). If the user receives an error it is reported to the user, e.g., via a control window associated with the presentation application (step 614). If the user receives the requested subsequent portion, the portion is displayed by the client (step 616).

Figure 7:
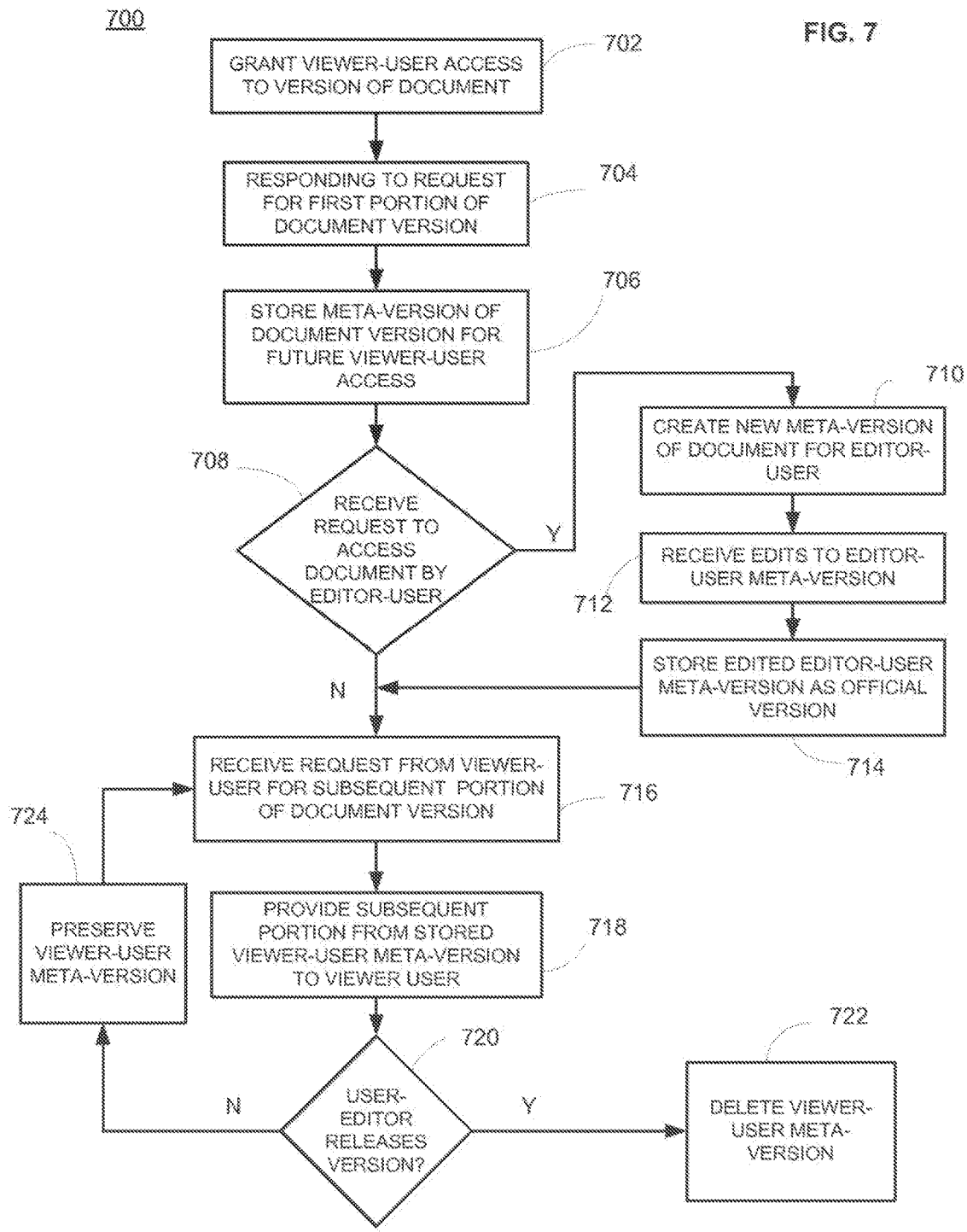
FIG. 7 is a flow chart of a method of preserving time consistent versions of collaboratively modified documents suitable for use by the system of FIGS. 1 and 2, according to an illustrative embodiment of the invention.

FIG. 7 is a flow chart of a method 700 of preserving time consistent versions of collaboratively modified documents suitable for use by the system of FIGS. 1 and 2, according to an illustrative embodiment of the invention. The method 700 is particularly suited for use with implementations of the systems of FIGS. 1 and 2 that employ document management systems with versioning control. The method 700 begins with the server 120 granting a viewer-user access to a version of a document stored in a document management system (step 702). More particularly, the server 120 grants the viewer-user access to a meta-version of the version of the document. The server 120 then responds to a request from the viewer user to download a first portion of the version of the document (step 704). This can be accomplished, for example, according to steps 402-406 of method 400 of FIG. 4. For example, the server 120 responds to the request by creating a permissions token that identifies the meta-version of the document to which the viewer-user has been granted access. The server 120 then includes the permissions token in a transmission to the viewer-user along with the requested portion. In addition, the server 120 stores the meta-version of the version of the document for future access by the viewer-user (step 706).

If, while the viewer-user has access to the version, an editor-user requests access to the same version from the document management system (at decision block 708), the server 120 creates a new meta-version of the version of the document being viewed by the viewer-user (step 710). In one embodiment, the records of the document management system are updated upon creation of the new meta-version to indicate that the new editor-user meta-version of the version of the document is the new official instance of the version. After receiving edits to the editor-user meta-version (step 712), the server 120 stores the modified editor-viewer meta-version as the official version of the document in the document management system. The server 120 continues to preserve the viewer-user meta-version of the document, without any of the modifications entered by the editor-user. Upon the server 120 receiving a request from the viewer user for a subsequent portion of the version of the document (step 716), the server 120 transmits the subsequent portion from the preserved viewer-user meta-version. If the viewer-user closes or otherwise releases the meta-version of the document (decision block 720), the server 120 deletes the viewer-user meta-version, leaving only the edited editor-user version in storage. Otherwise, the server 120 continues to preserve the viewer-user meta-version until it is released (step 724).

In an alternative implementation, instead of the server 120 creating a new meta-version of a version of a document upon receipt of an access request from an editor-user, the server 120 creates a new meta-version for use by the viewer user upon granting the viewer-user access. It is then this new viewer-user meta-version that is preserved until the user closes or otherwise releases the meta-version.

While various embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A method of collaborative document editing, the method comprising:
   allowing concurrent document editing by a first user of a first client device and a second user of a second client device;
   receiving, at a server from the first client device, a first edit for a document stored at the server;
   receiving, at the server from the second client device, a second edit for the document;
   merging the first edit and the second edit into the document;
   receiving, by the server, a request of a third user to access the document;
   determining, by the server, whether the third user is authorized to access the document using a token associated with the third user; and
   in response to determining that the third user is authorized to access the document, providing at least a portion of the document with merged first and second edits for presentation to the third user.

2. The method of claim 1 wherein the token is further associated with the document.

3. The method of claim 1 wherein providing the at least a portion of the document for presentation to the third user comprises sending a portion of a recent version of the document to a third client device of the third user.

4. The method of claim 3 wherein the portion of the recent version of the document is sent to the third client device of the third user responsive to the request of the third user not including a version identifier.

5. The method of claim 4 wherein the request of the third user includes a user identifier of the third user and a document identifier of the document.

6. The method of claim 1 wherein the third user is a viewer user.

7. The method of claim 1 further comprising:
   before allowing the third user to access the at least a portion of the document, determining that the third user is still authorized to access the document.

8. The method of claim 1 further comprising:
   revoking user authorization to access the document in view of one or more revocation criteria.

9. The method of claim 8 wherein the one or more revocation criteria relate to at least one of a time or a user permission level.

10. A system for collaborative document editing, the system comprising:
    a memory; and
    a processor, coupled to the memory, to:
    allow concurrent document editing by a first user of a first client device and a second user of a second client device;
    receive, at a server from the first client device, a first edit for a document stored at the server;
    receive, at the server from the second client device, a second edit for the document;
    merge the first edit and the second edit into the document;
    receive, by the server, a request of a third user to access the document;
    determine, by the server, whether the third user is authorized to access the document using a token associated with the third user; and
    in response to determining that the third user is authorized to access the document, provide at least a portion of the document with merged first and second edits for presentation to the third user.

11. The system of claim 10 wherein to provide the at least a portion of the document for presentation to the third user, the processor is to send a portion of a recent version of the document to a third client device of the third user.

12. The system of claim 11 wherein the portion of the recent version of the document is sent to the third client device of the third user responsive to the request of the third user not including a version identifier, and wherein the request of the third user includes a user identifier of the third user and a document identifier of the document.

13. The system of claim 10 wherein the processor is further to:

before allowing the third user to access the at least a portion of the document, determine that the third user is still authorized to access the document.

14. The system of claim 10 wherein the processor is further to:
revoke user authorization to access the document in view of one or more revocation criteria, wherein the one or more revocation criteria relate to at least one of a time or a user permission level.

15. A non-transitory computer-readable medium providing instructions which when executed by a processor cause the processor to perform operations comprising:
allowing concurrent document editing by a first user of a first client device and a second user of a second client device;
receiving, at a server from the first client device, a first edit for a document stored at the server;
receiving, at the server from the second client device, a second edit for the document;
merging the first edit and the second edit into the document;
receiving, by the server, a request of a third user to access the document;
determining, by the server, whether the third user is authorized to access the document using a token associated with the third user; and
in response to determining that the third user is authorized to access the document, providing at least a portion of the document with merged first and second edits for presentation to the third user.

16. The non-transitory computer-readable medium of claim 15 wherein providing the at least a portion of the document for presentation to the third user comprises sending a portion of a recent version of the document to a third client device of the third user.

17. The non-transitory computer-readable medium of claim 16 wherein the portion of the recent version of the document is sent to the third client device of the third user responsive to the request of the third user not including a version identifier, and wherein the request of the third user includes a user identifier of the third user and a document identifier of the document.

18. The non-transitory computer-readable medium of claim 15 wherein the third user is a viewer user.

19. The non-transitory computer-readable medium of claim 15 wherein the operations further comprise:
before allowing the third user to access the at least a portion of the document, determining that the third user is still authorized to access the document.

20. The non-transitory computer-readable medium of claim 15 wherein the operations further comprise:
revoking user authorization to access the document in view of one or more revocation criteria, the one or more revocation criteria relate to at least one of a time or a user permission level.

\* \* \* \* \*